March 7, 1933. J. HARTSHORN 1,900,645
ANIMAL TRAP
Filed June 30, 1930
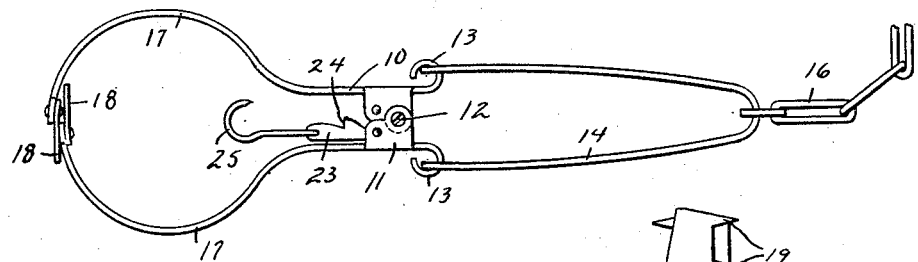
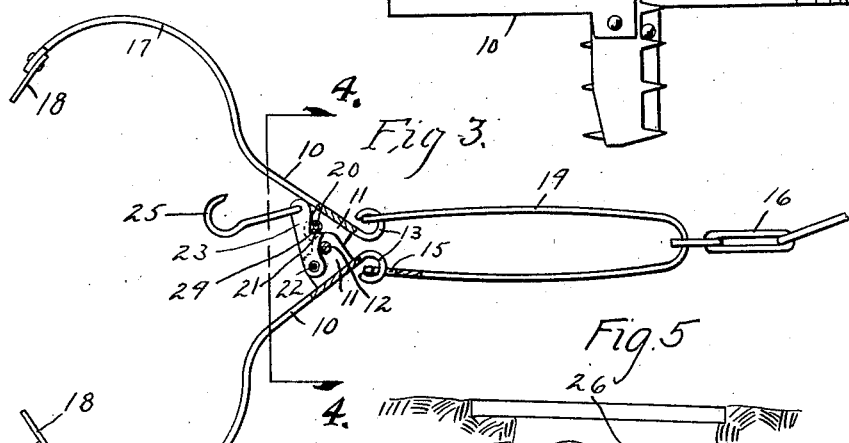
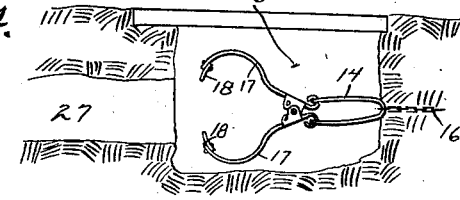
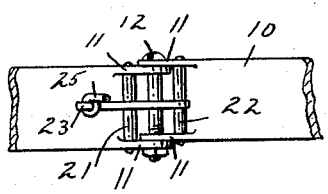
Inventor
Joseph Hartshorn
by Orwig & Hague Attys Patented Mar. 7, 1933

1,900,645

UNITED STATES PATENT OFFICE

JOSEPH HARTSHORN, OF FORT DES MOINES, IOWA

ANIMAL TRAP

Application filed June 30, 1930. Serial No. 464,928.

The object of my invention is to provide a simple, durable and inexpensive animal trap, which is particularly adapted to be used for trapping gophers and burrowing animals, which is easy to set, and which is positive in its operation.

A further object is to provide a trap of the class above described, so constructed and arranged that the animal will be engaged by the neck instead of by the foot or leg, as heretofore has been the practice.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a top view of my improved trap in a closed position.

Figure 2 is an end elevation of same.

Figure 3 is a top view of my improved trap in a set position, a portion of the pivot member being broken away.

Figure 4 is a detail sectional view taken on the line 4—4 of Figure 3.

Figure 5 shows one manner in which my improved trap may be applied for trapping gophers and other burrowing animals.

My improved trap comprises a pair of bars 10, each of which is provided with a pair of inwardly projecting lugs 11. The lugs of one of said bars 10 are pivotally connected to the lugs of the opposite bar by means of a pivot member 12. The inner ends of the bars 10 terminate in loop portions 13, and are designed to receive the free ends of a substantially U-shaped spring 14, formed of a flat bar having suitable openings 15 for receiving the loops 13. A chain 16 is provided for the spring 14, which may be anchored by a suitable stake not illustrated.

The free ends of the bars 10 are provided with outwardly curved portions 17, each of which terminates in a perpendicularly arranged jaw member 18. The inner edges of said jaw members are provided with teeth 19. One of the jaw members 18 is arranged to overlap the other, in the manner illustrated in Figure 1, when the jaw members are in closed position.

Supported in one pair of the lugs 11 is a pin 20 having a roller 21. The opposite pair of lugs 11 is provided with a pin 22 designed to support a latch bar 23, having a notch 24 for receiving the roller 21 when the jaw members 17 are in an open position, as illustrated in Figure 3.

Thus means is provided whereby the said jaw members will be locked against the closing action of the spring 14.

The free end of the lever 23 is provided with a bait hook 25.

In the operation of my improved trap, the jaw members 18 are locked in an open position and the trap so placed that the animal must enter between the jaw members 18, which are supported in either a horizontal or vertical position. When the jerking of the bait is applied to the hook 25, the notch 24 of the lever 23 will disengage the roller 21, after which the spring 14 will cause the teeth 19 of the jaw members 18 to grip the animal's neck. The pressure of the jaw members causes the animal to be strangled, thereby relieving the animal of a large amount of pain, as is the case when engaged by the foot or leg, and also eliminates the possibility of escape.

In Figure 5 I have illustrated one manner in which the trap may be supported for catching gophers. The trap is placed in a hole 26, making connection with the animal's run 27, in such manner that the animal must enter the trap between the said jaw members. The width of the hole 26 is slightly greater than the length of the jaw members 18. Other means, of course, may be provided for mounting the trap, the main idea being to set the trap in such a manner that the animal must enter the same between the jaw members 18.

Thus it will be seen that I have provided a trap of simple, durable and inexpensive construction, which is reliable in its operation, and which will not easily become inoperative, inasmuch as all delicate tripping mechanisms are eliminated, and at the same time is sensitive enough to insure catching of the animal.

I claim as my invention:

1. A trap comprising a pair of bars, each having a pair of inwardly projecting lugs, means for pivoting the lugs of one bar to the lugs of the opposite bar, one set of corresponding ends of said bars being provided with loop portions, a substantially U-shaped spring having its free ends connected to said loops, the opposite end of said bars being provided with outwardly curved portions, a jaw bar supported perpendicularly to the free ends of said bars, the inner edges of said jaw bars being provided with inwardly projecting teeth, one of said jaw bars being adapted to overlap the other when in a closed position, a latch bar pivotally connected between one set of said inwardly projecting lugs, a pin carried by the other set of inwardly projecting lugs designed to be engaged by said latch bar, and a bait hook carried by the free end of said latch bar.

2. A trap comprising a pair of jaws, each having a pair of inwardly projecting lugs at one end and teeth at its opposite end, means for pivoting the lugs of one jaw to the lugs of the opposite jaw, yieldable means for closing said jaws, a latch bar pivotally connected between one set of said inwardly projecting lugs, a pin carried by the other set of inwardly projecting lugs designed to be engaged by said latch bar, and a bait hook carried by the other end of said bar.

JOSEPH HARTSHORN.